United States Patent [19]
Okada

[11] 3,834,716
[45] Sept. 10, 1974

[54] SPACER EXPANDER WITH GUIDE ROD FOR PREVENTING OVERLAPPING OF THE ENDS OF THE SPACER EXPANDER

[75] Inventor: Syoji Okada, Ohmiya, Japan
[73] Assignee: Nippon Piston Ring Co., Ltd., Tokyo, Japan
[22] Filed: Aug. 1, 1973
[21] Appl. No.: 384,539

[30] Foreign Application Priority Data
Aug. 2, 1972 Japan.............................. 47-90392

[52] U.S. Cl...................... 277/9, 267/1.5, 277/220
[51] Int. Cl............................. F16j 9/06, F16j 9/18
[58] Field of Search.......... 277/9, 9.5, 11, 220, 221, 277/222, 218, 219, 154, 155, 160, 139, 140, 141; 267/1.5

[56] References Cited
UNITED STATES PATENTS
2,383,825  8/1945  Smith................................. 277/160
2,517,225  8/1950  McFall................................ 277/162
2,639,205  5/1953  Wilkening et al................... 277/160

Primary Examiner—Louis R. Prince
Assistant Examiner—Robert I. Smith
Attorney, Agent, or Firm—Sughrue, Rothwell, Mion, Zinn & Macpeak

[57] ABSTRACT

Herein disclosed is a radially undulating spacer expander structure for use in a combined oil scraper piston ring together with an arcuate guide rod. The spacer expander has its two ends formed into an abutting portion and has one of its undulations composed of a crest portion, a trough portion and two connecting portions connecting the crest portion and the trough portion. A plurality of those of the undulations, which are positioned in the vicinity of the two ends, are formed at the connecting portions with bores which are positioned close to either of the crest portion or the trough portion. A plurality of those of the undulations, which are positioned at one side of the two ends, are formed at the connecting portions with slots which are positioned adjacent to the bores. The spacer expander further includes an arcuate guide rod which is received in both of the bores and the slots. According to one feature of the present invention, the guide rod has its one end folded or formed into a trapezoid space, which is defined by the connecting portion of one of the undulations and by either of the crest portion and the trough portion of the same, so as to have the one end portion retained at its folded or formed portion in the trapezoid space, so that the two ends of the spacer expander can be made free from any overlapping even when the two ends are made to approach to each other.

2 Claims, 6 Drawing Figures

3,834,716

SPACER EXPANDER WITH GUIDE ROD FOR PREVENTING OVERLAPPING OF THE ENDS OF THE SPACER EXPANDER

BACKGROUND OF THE INVENTION

1. Field of the Invention

The present invention relates to a combined oil scraper piston ring for use with an internal combustion engine, and, more particularly, to a radially undulating spacer expander which constitutes the combined oil scraper piston ring in combination with two side rails.

2. Description of the Prior Art

When it is intended to fit a spacer expander of the above type into a piston ring groove which is formed in an outer periphery of a piston, then the two mating ends of the spacer expander are at first widened to be mounted in the piston ring groove. The two ends of the spacer expander are then brought into abutting engagement with each other. Thus, the spacer expander is received in the piston ring groove for operation. In this instance, however, such difficulty is often experienced as the spacer expander has its two ends overlapping or overlying the other. After the spacer expander is fitted in the piston ring groove, two side rails are usually inserted into the spaces which are formed between the two sides of the spacer expander and the inner walls of the piston ring groove. At this particular instant, however, the two ends of the spacer expander are often extended to lie over the other.

If the piston having such overlapping spacer expander is inserted into an engine cylinder, then the expander cannot perform its intrinsic function to apply a required amount of tension to the side rails. This will result not only in increase in consumption rate of lubricating oil but also in engine stoppage, which means loss of the most substantial function as an internal combustion engine.

SUMMARY OF THE INVENTION

It is, therefore, a major object of the present invention to provide an improved spacer expander for use in a combined oil scraper piston ring for an internal combustion engine.

Another object of the present invention is to provide a radially undulating spacer expander of the above type which is free from overlapping of its mating ends even if it has a relatively small axial width.

A still another object of the invention is to provide an improved combination of the above spacer expander with an arcuate guide rod which has its one end retained in the spacer expander in a simple but effective manner.

BRIEF DESCRIPTION OF THE DRAWINGS

Other objects and advantages of the present invention will be apparent from the following description taken in conjunction with the accompanying drawings, in which.

DESCRIPTION OF THE PREFERRED EMBODIMENTS

Before entering into the detailed explanation of the preferred embodiments of the present invention, short review of one of the conventional spacer expander which has succeeded in preventing the overlapping of its two mating ends when it is fitted into the piston groove.

Figure 1:
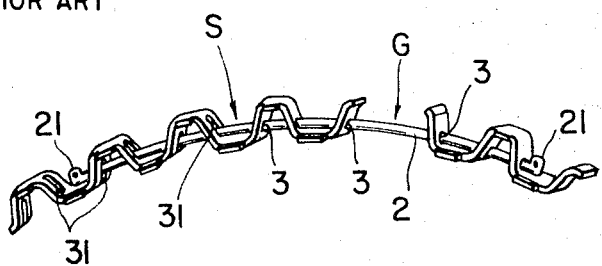
FIG. 1 is a perspective view showing one of the conventional spacer expanders.

Referring now to FIG. 1, the spacer expander S has its two mating ends formed into an abutting portion G. This spacer expander S has, as shown, a number of radial undulations, each of which is composed of a crest portion, a trough portion and two connecting portions connecting both of the crest portion and the trough portion. A plurality of those undulations, which are positioned in the vicinity of the abutting portion G or the two ends, are formed at their connecting portions with bores 3 which are sized to admit an arcuate guide rod 2 but to prevent stopper portions 21, which are formed on or attached to the ends of the guide rod 2, from passing therethrough. A plurality of those undulations, which are positioned at one side of the abutting portion G, are formed at their connecting portions with larger slots 31 which are positioned adjacent to the bores 3 and which are sized to admit even the stopper portions 21. With these construction arrangements, therefore, the guide rod 2 is at first inserted into the bores 3 and into the slots 31, and then the stopper portions 21 are formed on the both ends of the guide rod 2 so as to retain thereat the guide rod 2 in the spacer expander S. Thus, the two ends of the spacer expander S are guided, when it receives the guide rod 2, by the guide rod 2, so that the two ends under consideration can be free from overlapping.

In this conventional proposal, however, some difficulty will take place if the stopper portions are formed on the guide rod which is made of metal, although it is feasible to form the stopper portions on the ends of the guide rod by the thermal deformation method if the guide rod is made of synthetic resin. In the latter case, that is, where the guide rod is made of synthetic resin, however, another difficulty will arise in that, if the axial width of the spacer expander is relatively small, the diameter of the guide rod accordingly has to be reduced to invite degradation of obtainable rigidity of the guide rod. As a result, the guide rod of decreased rigidity cannot perform its expectable function.

When, therefore, it is intended to use a spacer expander having a relatively small axial width, then there is no way but resorting to use of a metal guide rod. As has been described in the above, however, formation of the stopper portions is, in this instance, so highly difficult that actual use of the metal guide rod is not practical.

Figure 2:
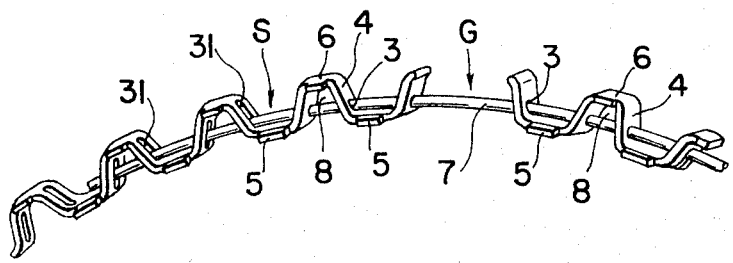
FIG. 2 is a perspective view showing a spacer expander which is being manufactured in accordance with the present invention.
Figure 4:
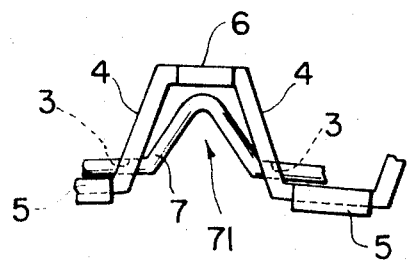
FIG. 4 is an enlarged plan view showing a retaining mechanism of a guide rod in the spacer expander of FIG. 3.
Figure 3:
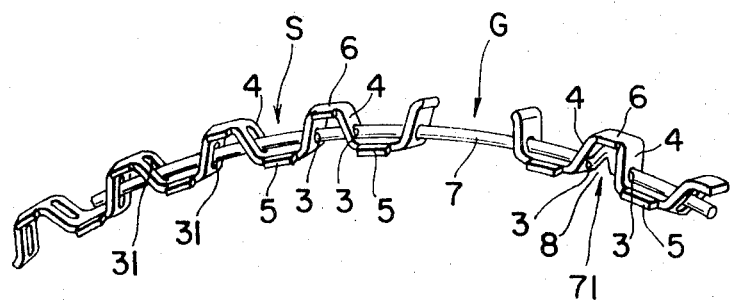
FIG. 3 is a perspective view showing a spacer expander of the present invention.

Turning now to FIG. 2 and 3, like reference numerals will indicate counter parts of FIG. 1, and as such being the case the repeated description thereof will be omitted here. Indicated at reference numerals 4, 5 and 6, however, are the connecting portions, the trough portion and the crest portion, respectively, which have already been explained with reference to FIG. 1. When, therefore, the guide rod 7 of metal is inserted into the bores 3 and slots 31 in such a manner as shown in FIG. 2, then a trapezoid space 8 is formed, which is defined by the crest portion 6 and by the adjoining connecting portions 4 merging into the particular portion 6, as shown. As is apparent from FIG. 3, only one end portion of the guide rod 7 is feld at numeral 71 into the trapezoid space 8. As a result, the above end portion of the guide rod 7 is retained at the fold portion 71 in the trapezoid space, as best shown in FIG. 4.

Therefore, when it is intended to fit the spacer expander of the invention into a piston ring groove 11 formed in the outer periphery of a piston 10, then the abutting portion G of the spacer expander is widened with its one end portion being retained in the trapezoid space 8 and with the other being freely received within the bores 3 and slots 31. With these end portions, it will be quite understandable that the spacer expander will be reliably guided by the guide rod 2, when its two ends are returned or made to approach to each other. Thus, the two ends can be free from any overlapping.

Figure 6:
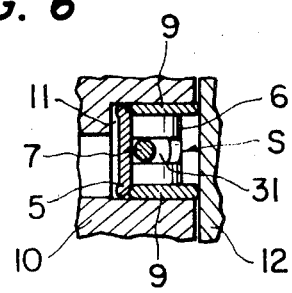
FIG. 6 is a longitudinal section showing the state of the associated elements of the oil scraper piston ring which is composed of the present spacer expander and of the side rails, when it is received in a piston ring groove formed in an engine piston.

In FIG. 6, the spacer expander S according to the invention is shown to be fitted in the piston ring groove 11 of the piston 10 in combination with two side rails 9. And, the piston 10 in combination with two side rails 9. And, the piston 10 itself is received within an engine cylinder 12, as shown.

Figure 5:
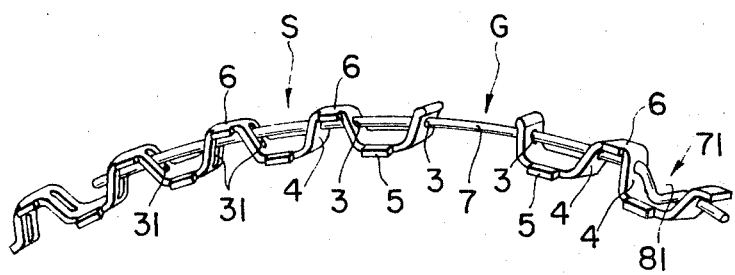
FIG. 5 is similar to FIG. 3 but shows another embodiment of the present invention.

In another embodiment of the present invention, on the other hand, a similar trapezoid 81 is formed and positioned in the vicinity of the trough portion, when the bores 3 are positioned close to the crest portion 6. It will be easily understandable here that the same resultant effect can be obtained from the arrangement in which the feld portion 71 is formed in the trapezoid space 81 for reliable retention, as shown in FIG. 5.

As has been described in the above, the spacer expander according to the present invention is reliably guided by a guide rod of metal in a manner that only one end portion of the guide rod is folded into a trapezoid space which is formed due to the undulating shape of the spacer expander. Thus, it should be appreciated that the present spacer expander is free from the conventional difficulty as is experienced in forming the stopper portions in the two ends of the metal guide rod. Moreover, the fact that the guide rod is made of metal can made it possible to use a spacer expander having a relatively small axial width without inviting the undesirable overlapping of the two ends of the spacer expander.

What is claimed is:

1. A radially undulating spacer expander structure comprising: a spacer expander formed of a multiplicity of radial undulations, said spacer expander having its two ends formed into an abutting portion and having its one of the undulations composed of a crest portion, a trough portion and connecting portions connecting adjacent crest and trough portions, a plurality of those of said undulations which are positioned in the vicinity of said two ends being formed at said connecting portions with bores which are positioned close to either of said crest portion and said trough portion, a plurality of those of said undulations which are positioned at one side of said two ends being formed at said connecting portions with slots which are positioned adjacent to said bores; and an arcuate guide rod received in both of said bores and said slots, wherein the improvement comprises said guide rod having its one end portion folded into a trapezoid space, which is defined by the connecting portions of one of said undulations and by either of said crest portion and said trough portion of the same, so as to have said one end portion retained at its folded portion in said trapezoid space, so that the two ends of said spacer expander can be made free from any overlapping even when the two ends of said spacer expander approach each other.

2. A radially undulating spacer expander structure according to claim 1, wherein said guide rod is made of metal.

* * * * *